United States Patent
Wang et al.

(10) Patent No.: US 12,229,669 B2
(45) Date of Patent: Feb. 18, 2025

(54) TECHNIQUES FOR IMPROVING STANDARDIZED DATA ACCURACY

(71) Applicant: Microsoft Technology Licensing, LLC, Redmond, WA (US)

(72) Inventors: Shuai Wang, Milburn, NJ (US); Peide Zhong, Milpitas, CA (US); Ji Yan, Dublin, CA (US); Feng Guo, Los Gatos, CA (US); Dan Shacham, Sunnyvale, CA (US); Fei Chen, Saratoga, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 918 days.

(21) Appl. No.: 17/340,607

(22) Filed: Jun. 7, 2021

(65) Prior Publication Data

US 2022/0391690 A1    Dec. 8, 2022

(51) Int. Cl.
| | |
|---|---|
| *G06N 3/08* | (2023.01) |
| *G06F 16/334* | (2025.01) |
| *G06F 18/2113* | (2023.01) |
| *G06F 18/214* | (2023.01) |
| *G06F 18/2413* | (2023.01) |
| *G06N 3/04* | (2023.01) |
| *G06Q 10/1053* | (2023.01) |

(52) U.S. Cl.
CPC ........... *G06N 3/08* (2013.01); *G06F 16/3347* (2019.01); *G06F 18/2113* (2023.01); *G06F 18/214* (2023.01); *G06F 18/24147* (2023.01); *G06N 3/04* (2013.01); *G06Q 10/1053* (2013.01)

(58) Field of Classification Search
CPC . G06N 3/08; G06N 3/04; G06N 5/022; G06F 16/3347; G06F 18/2113; G06F 18/214; G06F 18/24127; G06Q 10/1053; G06V 10/82
See application file for complete search history.

(56) References Cited

U.S. PATENT DOCUMENTS

| | | | |
|---|---|---|---|
| 11,645,479 B1 * | 5/2023 | Coursey | G06F 40/58 |
| | | | 704/9 |
| 2018/0336241 A1 * | 11/2018 | Noh | G06F 16/242 |

(Continued)

OTHER PUBLICATIONS

Devlin, et al., "BERT: Pre-training of Deep Bidirectional Transformers for Language Understanding", In Repository of arXiv:1810.04805v2, May 24, 2019, 16 Pages.

(Continued)

*Primary Examiner* — Alan Chen
(74) *Attorney, Agent, or Firm* — KDW FIRM PLLC

(57) ABSTRACT

Described herein is a technique for mapping the raw text of a job title of an online job posting to an entity embedding, associated with an entity or entry of a title taxonomy. The raw text of the job title is first encoded to generate a multilingual word embedding in a multilingual word embedding space. Then, the vector representation of the job title, as represented in the multilingual word embedding space is translated, using a neural network, to a vector representation of the job title in the entity embedding space. Finally, a nearest neighbor search is performed to identify an entity embedding associated with an entity or entry in the title taxonomy that has a vector representation that is closest in distance to the vector output by the neural network.

14 Claims, 6 Drawing Sheets

(56) References Cited

U.S. PATENT DOCUMENTS

2021/0174164 A1* 6/2021 Hsieh ................ G06Q 30/0282
2024/0330739 A1 10/2024 Lin

OTHER PUBLICATIONS

Huang, et al., "CoRel: Seed-Guided Topical Taxonomy Construction by Concept Learning and Relation Transferring", In Proceedings of the 26th ACM SIGKDD International Conference on Knowledge Discovery & Data Mining, Aug. 23, 2020, 9 Pages.
Yao, et al., "KG-Bert: BERT for Knowledge Graph Completion", In Repository of arXiv:1909.03193v2, Sep. 11, 2019, 8 Pages.
"Orthogonal Procrustes Problem", https://en.wikipedia.org/wiki/Orthogonal_Procrustes_problem, Jan. 25, 2021, 3 Pages.
Mikolov, et al., "Efficient Estimation Of Word Representations In Vector Space", In Repository of arXiv:1301.3781v3, Sep. 7, 2013, pp. 1-12.

* cited by examiner

TECHNIQUES FOR IMPROVING STANDARDIZED DATA ACCURACY

TECHNICAL FIELD

The present application generally relates to a machine learning concept referred to as embeddings. More specifically, the present application describes a technique that involves using a deep learning model to align a first embedding space, associated with multilingual word embeddings for job titles, with a second embedding space, associated with embeddings for a title taxonomy.

BACKGROUND

In the technical fields of machine learning and natural language processing, the term "embedding" is used to describe a technique that generally involves encoding the meaning of some raw data (e.g., text) into a real-valued vector, so that the vector representations of individual instances of the raw data will be close together in the embedding space when the individual instances of raw data have a similar meaning. By way of example, in the specific domain of job titles, the job title, "software engineer," has a meaning that is at least somewhat similar to the job title, "computer programmer." Accordingly, when each job title is represented as a vector in a common embedding space, the distance (e.g., Euclidean distance) between the two vectors would be less than the distance between either one of the two vectors and a third vector corresponding with a vector representation for the job title, "dentist." The example presented above involves words as the raw data for which the embeddings are generated. When words are the raw data, the embeddings are generally referred to as text embeddings or word embeddings. However, in other instances, embeddings can be derived for discrete data other than individual words, such as entire sentences, documents, or various combinations of data.

BRIEF DESCRIPTION OF THE DRAWINGS

Embodiments of the present invention are illustrated by way of example and not limitation in the figures of the accompanying drawings, in which.

DETAILED DESCRIPTION

Figure 1:
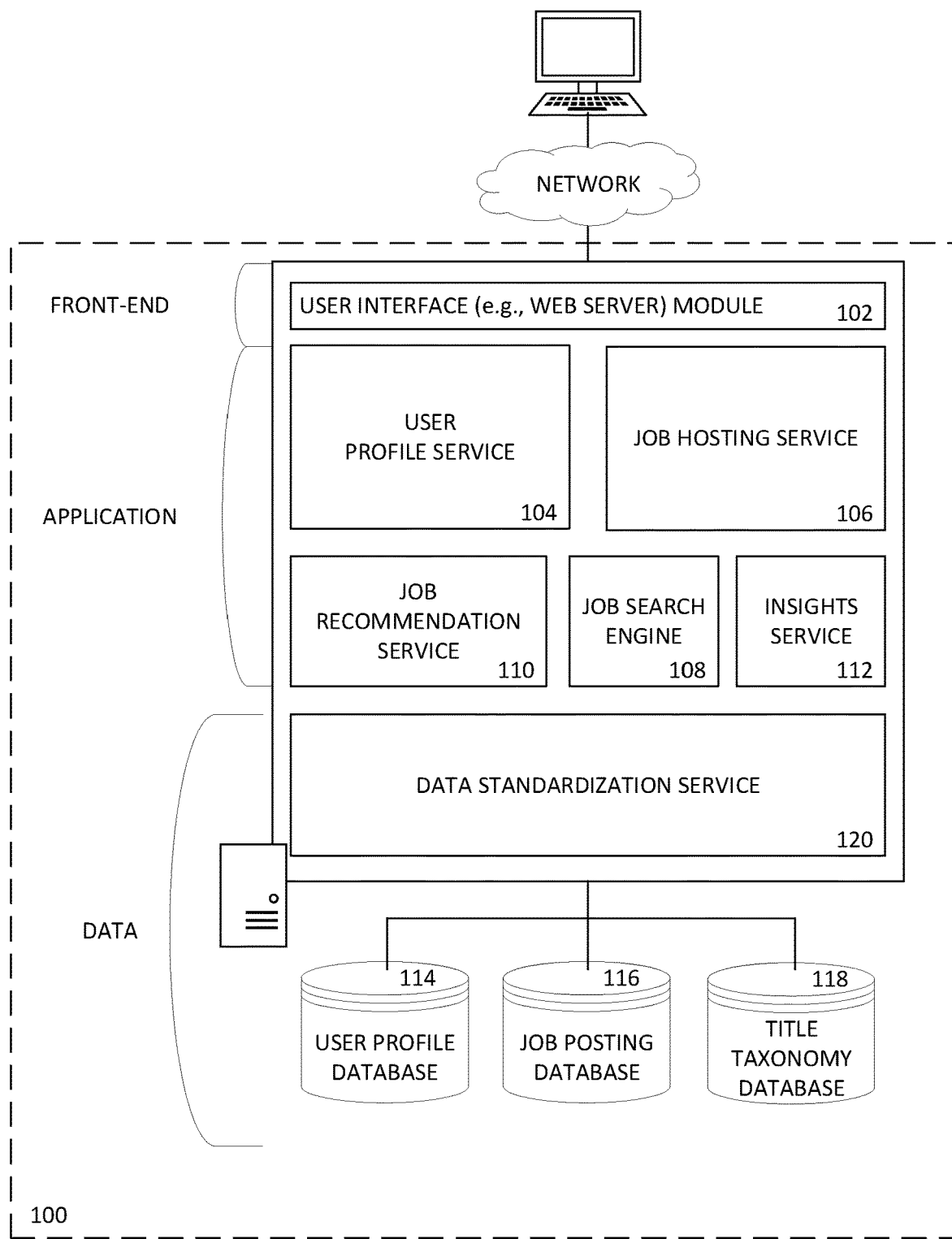
FIG. 1 is a system diagram illustrating an example of the functional components of an online service with which an embodiment of the present invention may be implemented and deployed.

Described herein are methods and systems for aligning a first embedding space, associated with multilingual word embeddings for job titles, with a second embedding space, associated with embeddings for a title taxonomy. By virtue of projecting the multilingual word embeddings for job titles into the embedding space of the title taxonomy, significant improvements to a variety of online services that involve analyses using job titles are achieved. In the following description, for purposes of explanation, numerous specific details and features are set forth in order to provide a thorough understanding of the various aspects of different embodiments of the present invention. It will be evident, however, to one skilled in the art, that the present invention may be practiced and/or implemented with varying combinations of the many details and features presented herein.

An online job hosting service is an online service that allows those who are seeking employees to post online job postings that describe available job opportunities, while simultaneously allowing those seeking job opportunities to search for and browse recommended online job postings. One of the fundamental ways in which most online job hosting services operate is by performing some type of matching between characteristics or attributes of a job opportunity as expressed by the various data fields of the online job posting, with characteristics or attributes of a job-seeking user, as may be embodied in a user profile associated with the job-seeker, or by processing a user's search query. In this context, one of the more important data fields is the job title—a term that is used to describe in a few words the employment position to which an online job posting relates, or in the context of a user profile, an employment position currently or previously held by an employee. For example, online job postings typically are presented in a manner that prominently displays the job title of the employment position to which the online job posting relates. Similarly, many users of an online job hosting service will maintain user profiles that list both their current job title, as well as any job titles from previously held employment positions.

Job titles are important as they serve as a fundamental data field for a variety of applications and services. For example, for active job-seekers, many online job hosting services provide a job-specific search engine that provides the active job-seeker the ability to submit a search query to search for active online job postings. Many of these job-specific search engines use an inverted index, with the job title serving as the index, to facilitate searching for relevant online job postings. For both active and passive job seekers, many online job hosting services provide a job recommendation service that identifies and presents groups of online job postings that have been selected for presentation to a job-seeker based on characteristics and attributes of the job-seeker, and/or past activity of the job-seeker (e.g., search history, job postings viewed, etc.). Similarly, a job alert service may generate a high-priority message (e.g., email, mobile notification, text message) when a specific online job posting is determined to be particularly relevant for a job-seeker, based in part on the job title of the job posting.

Many of these online job recommendation and alert services are implemented with machine learned models that utilize job titles as an input feature. Accordingly, the more accurate the job title is, the better the overall recommendation service will be. Finally, some online job hosting services provide data-driven insights about the labor market in general, such as trends within certain industries, and so forth. Many of these insights may be dependent upon and derived using information about the job titles of online job postings, and job titles of users as indicated in their respective user profiles.

Because job titles are important, job titles are frequently subjected to standardization procedures. One technique for deriving a standardized job title from the raw text of a job title from an online job posting involves attempting to map, for example, through a matching algorithm, words in the raw text of the job title from a job posting to words in a standardized job title that is specified in an expert curated knowledge graph or title taxonomy. For instance, with user generated content from user profiles and job postings, a title taxonomy may be derived through a combination of data mining, machine learning techniques, and expert analysis and curation. The title taxonomy may serve as a source of ground truth information for job titles, with each entry in the title taxonomy representing a unique job title. As users add new information to their user profiles over time, including new job titles, skills, and so forth, the title taxonomy is periodically updated to reflect these new job titles. In some instances, the title taxonomy may be organized as a hierarchical ontology with multiple levels, including a top level that represents a unique job title, with job title names expressed in one or more languages, a second level specifying an occupation, and a third level that specifies a parent occupation. In addition, in the title taxonomy, each unique entry—referred to herein as an entity—may be associated with additional information, such as a role, and one or more skills. By way of example, in the title taxonomy, the job title "Software Engineer" may have as a role, "Engineer," and as a skill, "Software Development."

For a variety of technical reasons, mapping a job title from an online job posting to an entity in a title taxonomy is a challenge. First, the raw text of a job title of an online job posting may include words that are not representative of the actual job title, but instead, provide some additional information about an online job posting. As an example, consider the following raw text provided as a job title for a job posting, "Travel RN starting with $15/hour, California." In this example, the relevant text for purposes of determining the job title is "RN," which is an abbreviation for "Registered Nurse." The word, "Travel," might be categorized as a job status descriptor (e.g., part-time, full-time, contractor, traveling, etc.), whereas the term, "$15/hour" indicates an hourly pay rate and the word, "California," provides some information about the general location of the employment position. Given the frequent occurrence of noise—for example, additional words that are not relevant to determining the job title—in the raw text of the data field for the job title of the online job posting, it becomes difficult to map the raw text of the job title to a corresponding entity in the title taxonomy. Experience shows that the greater the number of words included in the raw text of a job title of a job posting, the lower the confidence score will be when mapping the job title of the job posting to an entity in the title taxonomy.

Another problem arises due to job titles being expressed in different languages for different geographical regions, and some languages being low resource languages. In this context, a low resource language is a language that is less frequently used and therefore lacking in the amount of raw text that might be used, for example, to generate training data for machine learning algorithms. For instance, each entry in the title taxonomy may include a job title name, expressed in multiple languages. As an example, an entry in the title taxonomy for the job title, "software engineer," as expressed in the English language, may also include data fields storing the job title in one or more other languages, such as, "ingeniera de software," as expressed in the Spanish language, and "программист," as expressed in the Russian language. However, in many instances, a job title may not be included in an entry in one or more low resource languages. Accordingly, if a job title from a job posting in a specific language does not have a corresponding entry in the title taxonomy, the matching algorithm will not identify a matching entity in the title taxonomy.

Consistent with embodiments of the present invention and to address the aforementioned problems, a technique that involves embeddings is utilized to map the raw text of a job title as expressed in a job posting with one or more entities in a title taxonomy. Specifically, the raw text of a job title of an online job posting is processed to generate a vector representation of the job title in a multilingual word embedding space. Similarly, each entity in the title taxonomy is processed to generate for each entity a vector representation of the entity in a separate embedding space, referred to herein as an entity embedding space. Because the multilingual word embedding space for the raw text of the job title is a different embedding space than the entity embedding space for the entities of the title taxonomy, a neural network is used to align the two embedding spaces. Specifically, the vector representation of a job title in the multilingual word embedding space is provided as an input to the input layer of a trained neural network. The output layer of the neural network outputs a vector representation of the raw text of the job title of the online job posting, translated to the entity embedding space. Because the vector that is output by the neural network may not exactly match a specific vector representation corresponding with an entity in the title taxonomy, a nearest neighbor search is conducted to identify the entity in the title taxonomy having the vector representation in the entity embedding space that is closest in distance to the vector output of the neural network. For example, using the output of the neural network, a nearest neighbor search is performed to identify the entity in the title taxonomy that is closest in distance (e.g., Euclidian distance) to the vector representation of the raw text of the job title as translated into the entity embedding space by the neural network model. The vector representation of the entity from the title taxonomy that is determined to be closest in distance to the output of the neural network is then selected as the vector representation in the entity embedding space to be associated with the job title of the online job posting. Accordingly, this vector representation in the entity embedding space corresponds with a job title in the title taxonomy, which is ultimately assigned to or otherwise associated with the online job posting.

Consistent with some embodiments, instead of using the vector output by the neural network to identify a single vector representation in the entity embedding space for the title taxonomy, a nearest neighbor search is performed to identify several entity embeddings in the entity embedding space, corresponding with entries in the title taxonomy. For instance, a nearest neighbor search may be performed to identify vectors corresponding with a set of entity embeddings from the title taxonomy that are close in distance to the vector that is output by the neural network. Each entity embedding in the set of entity embeddings corresponds with an entry in the title taxonomy, generally, and a job title specifically. Accordingly, as described in greater detail below and consistent with some embodiments, a ranking score may be derived for each entity in the title taxonomy that corresponds with an entity embedding in the set of entity embeddings that have been identified via the nearest neighbor search. The ranked list of entities from the title taxonomy can then be stored in association with the online job posting, so that various services (e.g., job search engine, job recommendation service, etc.) can utilize the entity embeddings associated with the online job postings. For instance, if a user initiates a job search with the query, "machine learning engineer," an online job posting that has a job title of "software engineer," as recited by the raw text, may nevertheless satisfy the query if an entity embedding associated with the job title, "software engineer," has been stored in association with the online job posting.

Several advantages arise from representing the raw text of job titles with multilingual word embeddings in a single, multilingual word embedding space. A multilingual word embedding space represents words in multiple languages in a single distributional vector space or embedding space. Just as words with similar meanings have similar vector representations in a monolingual word embedding space, in a multilingual word embedding space, words expressed in different languages that have the same and/or similar meanings are represented by similar vectors in the embedding space. Accordingly, a job title name expressed in two different languages will have vector representations that are close in distance to one another within the multilingual embedding space. For example, the vector representation for the job title, "software engineer," in the English language, will have a similar vector representation to the same job title as expressed in Spanish, for example, "ingeneria de software." By using multilingual word embeddings for the raw text of the job titles from job postings, the overall complexity of the system is significantly reduced, as a single machine learned model can be used to align the multilingual word embedding space with the entity embedding space. Without a multilingual word embedding space, in order to align separate, monolingual word embeddings with an entity embedding space, separate machine learned models would be needed for each monolingual word embedding space.

In addition, by using multilingual word embeddings, the overall system benefits from what is commonly referred to as transfer learning. Transfer learning involves the re-use of knowledge gained from one machine learning task, in a second or subsequent machine learning task. In this case, by using the multilingual word embeddings for the raw text of the job titles, job titles from job postings that are expressed in low resource languages may be mapped to entities in the entity embedding space, even when a job title in the low resource language is not explicitly associated with an entity. By way of example, consider again the scenario in which a job posting in the Swedish language includes a job title, "hjärtkirurg," which translates to "heart surgeon" in the English language. If the entity in the title taxonomy that corresponds with the job title, "heart surgeon" does not explicitly specify or include the Swedish language equivalent, "hjärtkirurg," because the vector representation of "hjärtkirurg" in the multilingual word embedding space is close in distance to the vector representation for the job title, "heart surgeon" in the entity embedding space, the job title, "hjärtkirurg," will properly map to the correct entity in the title taxonomy. As a result, by using multilingual word embeddings, significantly more candidate job titles can be identified. Other advantages and aspects of the various embodiments of the present invention will be readily apparent from the description of the various figures that follow.

FIG. 1 is a system diagram of an online job hosting service with which an embodiment of the present invention may be implemented and deployed. As shown in FIG. 1, a front-end layer comprises a user interface module (e.g., a web server) 102, which receives requests from various client computing devices and communicates appropriate responses to the requesting client devices. For example, the user interface module(s) 102 may receive requests in the form of Hypertext Transfer Protocol (HTTP) requests or other web-based API requests.

An application logic layer may include one or more application server modules, which, in conjunction with the user interface module(s) 102, generate various user interfaces (e.g., web pages) with data retrieved from various data sources in a data layer. Consistent with some embodiments, individual application server modules implement the functionality associated with various applications and/or services provided by the online system/service 100. For instance, the application logic layer may include a variety of applications and services to include a user profile service 104, an online job hosting service 106, a job search engine, a job recommendation service, and an insights service 112.

Consistent with some embodiments, the user profile service 104 provides the user with the ability to register with the online service to become a registered user (e.g., a member) and provide information to be included as part of a user profile of the user. By way of example, the user profile service 104 may prompt the user to enter his or her name, contact information (e.g., email address, phone number, residential address), as well as information about current and past employment positions. For instance, the user may be prompted to provide the company or organizational names of current and/or past employers, as well as the job titles of any employment positions the user currently has or previously held with those employers, and the dates on which employment began and/or ended. In some instances, the user profile service 104 may prompt the user to add or specify skills to the user profile. As information is provided by the user, the user profile service 104 stores the information in one or more databases, such as the user profile database 114.

Another service shown in FIG. 1 as part of the application layer is an online job hosting service 106. Users who are in search of employees may interact with the job hosting service 106 to specify and provide information to be included in an online job posting. For instance, a user interface of the job hosting service 106 may prompt a user to provide a variety of information to be included with a job posting. By way of example, such information may include a company name at which the employment position is being offered, a job title, a role or job function, one or more desired skills to be possessed by candidates, salary information, a location of the employment position, a job status descriptor (e.g., full-time, part-time, contract, contract-to-hire, traveling, etc.), and so forth. In addition to enabling users to directly generate and submit job postings via the job hosting service 106, in some instances, the job hosting service 106 may include a job posting ingestion engine (not shown) capable of ingesting job postings that are hosted at third party websites, such as other job hosting services and/or company websites. The job hosting service 106 stores the information relating to the job postings in one or more databases, such as the job postings database 116.

Consistent with some embodiments, the online service provides a job search engine 110 by which job-seeking users can submit search queries to search for online job postings hosted by the job hosting service 106. In addition, a job recommendation service 110 may periodically identify a group of online job postings for a particular user and present the recommended job postings to the user via any one of a variety of presentation channels (e.g., a feed, email, messaging application, or a web page or other user interface dedicated to recommended job postings). Consistent with some embodiments, an insights service may provide users with data-driven insights about labor market trends, industry trends, and so forth. For example, by analyzing user profile data and/or job posting data over time, the insight service may identify trends relating to increases and/or decreases in certain employment positions (e.g., by job title).

As illustrated in FIG. 1, the data layer of the online service 100 includes what is referred to as a data standardization service 120. Consistent with some embodiments, certain events may trigger a particular data standardization routine or function of the data standardization service 120. By way of example, when a new online job posting is posted (or ingested), the data standardization service 120 may be triggered to analyze the information relating to the job posting, and to process various portions of the information from the job posting to generate standardized data representations for certain data elements. As described in greater detail below and consistent with embodiments of the present invention, the raw text of a job title of an online job posting, as entered by the user posting the job posting or as ingested from a third-party website, is processed for the purpose of identifying one or more standardized job titles, as maintained in a title taxonomy stored in a title taxonomy database 118, that best correlates with the job title as represented by the raw text.

Figure 2:
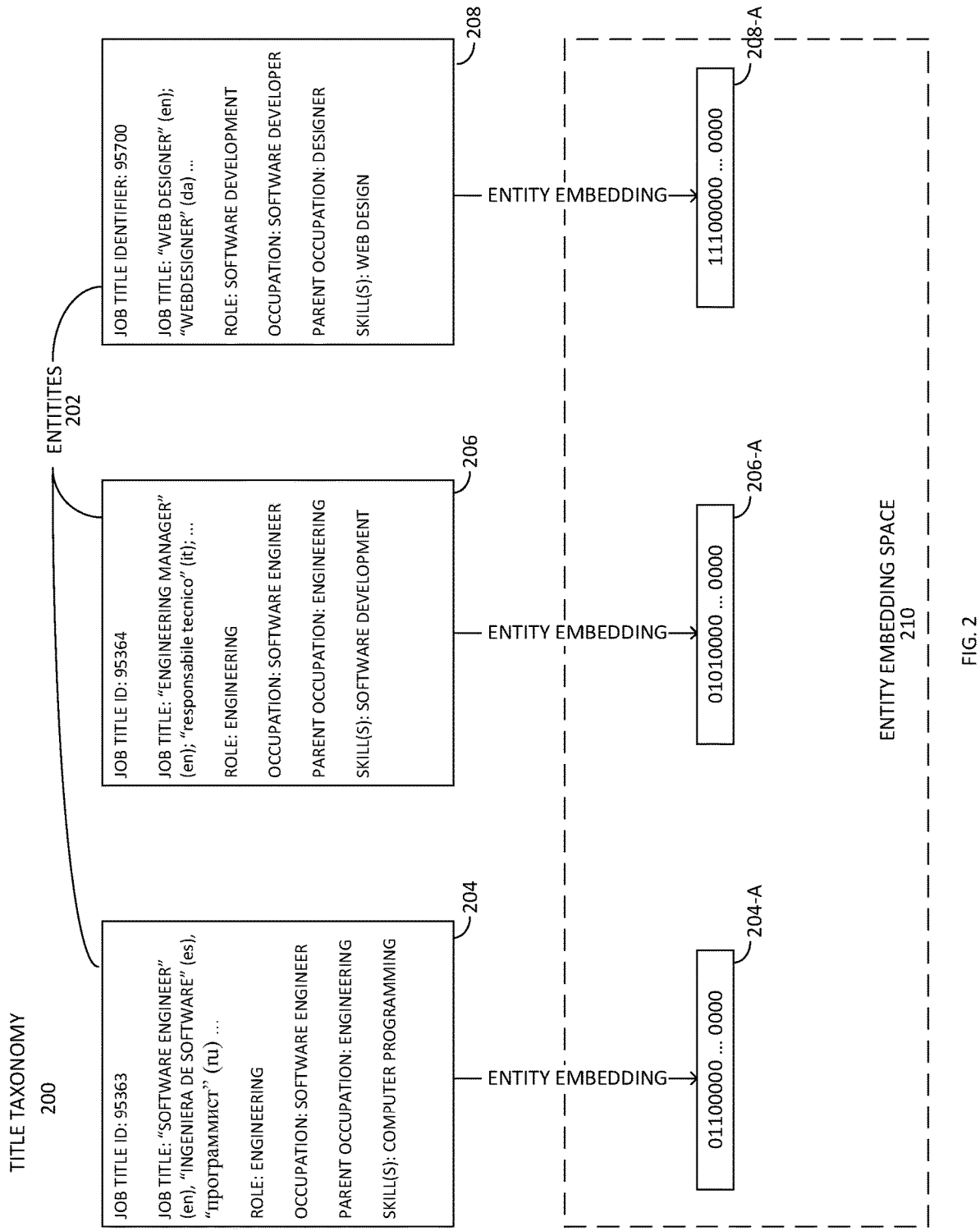
FIG. 2 is a diagram illustrating an example of a title taxonomy, with each unique entry in the title taxonomy having a corresponding entity embedding in an entity embedding space, consistent with some embodiments of the present invention.

FIG. 2 is a diagram illustrating an example of a portion of a title taxonomy 200, with each unique entry in the title taxonomy 200 having a corresponding entity embedding in an entity embedding space 210, consistent with some embodiments of the present invention. As denoted by reference number 202, each individual collection of data that makes up an individual entry in the title taxonomy is referred to herein as an entity 202 of the title taxonomy. As shown in FIG. 2, a small sample of a title taxonomy is illustrated. Specifically, three individual entries from the title taxonomy are presented. In an actual implementation, the number of entries in a taxonomy may be in the tens of thousands.

In this particular example of a title taxonomy, each entity has a job title identifier that uniquely identifies the entity. For example, the entity with reference number 204 has the job title identifier, "95363." Consistent with some embodiments, the title taxonomy is a multilingual taxonomy, as each entity will include a job title name expressed in one or more languages. By way of example, the entity with reference number 204 corresponds with the job title, "software engineer," as expressed in the English language. In addition, the entity 204 specifies the job title name in additional languages, including Spanish ("ingeniera de software") and Russian ("программист"). Although not shown, the entity may include additional synonymous job title names in other languages as well.

As shown in FIG. 2, each entity specifies a role, an occupation, a parent occupation, and one or more skills. For instance, the entity from the title taxonomy with reference number 204 is for the job title, "Software Engineer." The role associated with the job title is "engineering." The occupation and parent occupation are "software engineering" and "engineering," respectively. Finally, one or more skills may be associated with the job title. In this case, the job title, "Software Engineer" is associated with the skill, "computer programming." The title taxonomy illustrated in FIG. 2 is provided as one example, and the various data fields included in any given taxonomy may vary significantly from one implementation to another, while still being consistent with the present invention.

As illustrated in FIG. 2, the entity from the title taxonomy with reference number 204 is represented in the entity embedding space 210 as the entity embedding that corresponds with the vector with reference number 204-A. Similarly, the entity 206 is represented in the entity embedding space 210 by the vector 206-A. The entity 208 is represented in the entity embedding space by the vector 208-A. Although shown in FIG. 2 as bit vectors, in various embodiments, the vectors are real number vectors. The entity embedding space 210 is illustrated in FIG. 2 as a dashed bounding box for purposes of conveying an understanding of the present invention, a person of skill in the art will recognize that the entity embedding space is a vector space of lower dimensionality than the original input data, with each vector in the embedding space being derived with a common algorithm.

Consistent with some embodiments, to generate the entity embeddings from the individual entities, a machine learned model is trained to map each entity in the title taxonomy to an entity embedding in the entity embedding space. The output of the model is a real-valued vector representation that encodes the meaning of each entity, such that each vector that represents an entity is closer in distance to other vectors in the entity embedding space, when the meanings of the job titles associated with the entities are similar or related. By way of example, because the job title, "Software Engineer" associated with entity 204 shares in common the same role, occupation and parent occupation as the job title, "Engineering Manager," associated with entity 206, the expectation is that their respective vector representations, 204-A and 206-A, are closer in distance to one another, than some third vector representation corresponding with an entity for which there are no common data elements.

In order to generate the entity embeddings, a machine learning algorithm is used to train a model to map entities to their respective entity embeddings, or vector representations. One of the primary objectives in generating the entity embeddings is to ensure that entities that have similar or related job titles are mapped to vectors that are similar, as measured by their relative distance from one another in Euclidian space. Accordingly, the training technique used is a supervised training technique, with training data consisting of pairs of entities that have been labeled as positive examples, meaning that there is some similarity or relationship between the job titles of the respective entities, or labeled as negative examples, meaning that there is no similarity or relationship known to exist between the job titles. In order to generate the training data, various techniques may be used to identify when two job titles, corresponding with two entities in the title taxonomy, have a similarity or relationship. For instance, one technique involves identifying job titles associated with job postings that are selected for viewing by a user, where the selection is from the same set of search results. By way of example, if a user submits a search query, "software engineer," and is then presented with a set of search results (e.g., a list of online job postings), and the user selects a first job posting with title, "machine learning engineer," and subsequently selects a second job posting from the same set of search results with job title, "data scientist," this behavior by the user is used as a signal to indicate that the two job titles may be similar to one another. Accordingly, one way in which training data is derived is by analyzing historical data relating to the job posting selections that users have made after performing a search.

Another way in which training data may be derived is by comparing attributes of the entities in the title taxonomy. For example, when two different job titles associated with two different entities in the title taxonomy share in common one or more of the same attributes (e.g., occupation, parent occupation, role, and skill(s)), this can be used as a signal that the job titles in the two different entities may in fact be similar or related to one another. Similarly, when two job titles corresponding with two different entities in the title taxonomy do not share any attributes in common, the pair of entities may be used as a negative example.

Consistent with some embodiments, the loss function for training such a model may be formulated canonically as follows, $$Loss = \frac{1}{m}\sum_{1}^{m}(h_\theta(f(x), f(y))),$$

where
- $f(*)$ is a mapping function from an entity in the title taxonomy to an embedding.
- $h_\theta$ is a function to calculate the semantic distance between two entity embeddings, where $h_\theta \in [0, 1]$, and,
- m is the size of the training data.

Figure 3:
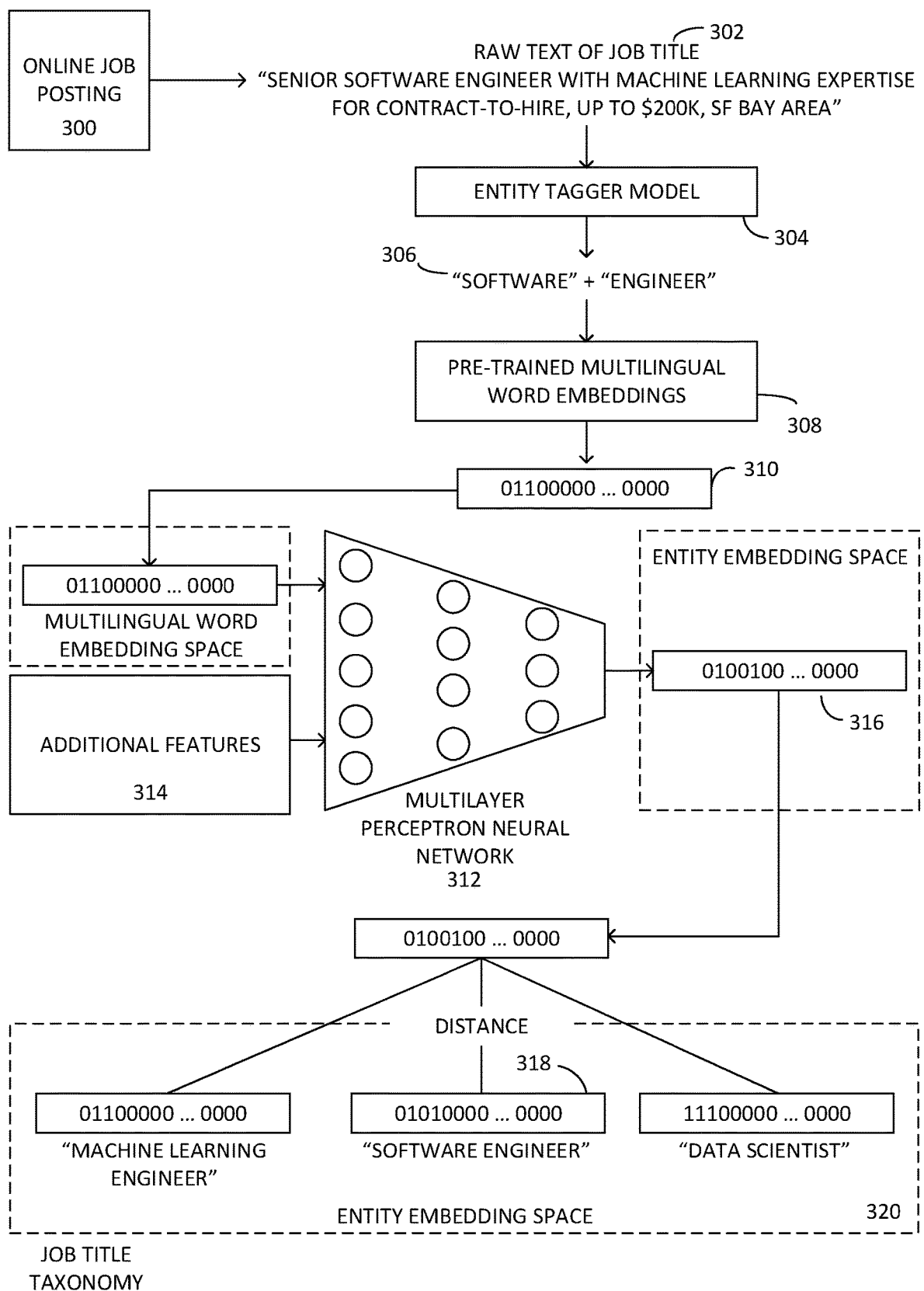
FIG. 3 is a data flow pipeline illustrating the various processing operations that occur as part of a technique to translate the raw text of a job title of an online job posting to an entity embedding in an entity embedding space associated with a title taxonomy, consistent with some embodiments of the present invention.

FIG. 3 is a data processing pipeline illustrating the various operations that occur as part of a technique to translate the raw text of a job title of an online job posting to an entity embedding in an entity embedding space associated with a title taxonomy, consistent with some embodiments of the present invention. As illustrated in FIG. 3, the first step in the process involves extracting the raw text of a job title 302 from an online job posting 300. For example, in FIG. 3, the raw text of the job title 302 for the online job posting 300 is indicated to be as follows, "SENIOR SOFTWARE ENGINEER WITH MACHINE LEARNING EXPERTISE FOR CONTRACT-TO-HIRE, UP TO $200K, SF BAY AREA." Many of the individual words in the raw text of the data field for the job title are not explicitly representative of the actual job title. For example, the phrase, "SF BAY AREA" is representative of a location at which the employment position is being offered. The text, "WITH MACHINE LEARNING EXPERTISE" is representative of a desired skill or experience that successful job candidates are expected to possess. Similarly, the text, "FOR CONTRACT-TO-HIRE" may be categorized as a job status descriptor, defining a characteristic of the employment position.

As indicated by reference number 304, after the raw text of the job title has been extracted from or otherwise obtained from the original job posting 300, the next step in the process involves providing the raw text of the job title 302 as an input to a model-based entity tagger 304. The entity tagger 304 is a trained model that takes as input a segment or sequence of text and provides as output tagged text, with each tag associated with an individual word in the raw text and indicating an entity type to which the text relates. For example, the entity tagger 304 may tag each word of the input (e.g., the raw text of the job title) with a tag that indicates whether the individual word is representative of a job title, a job status descriptor (e.g., part-time, full-time, contractor, traveling, etc.), a skill, a location, or perhaps some other entity type that is commonly included in the raw text of job titles. While the entity tagger 304 may tag text with various entities, for purposes of the pipeline processing illustrated in FIG. 3, the important tagged text is those words that have been tagged as being representative of the job title. As shown with reference number 306, the two words from the raw text of the job title that have been tagged by the entity tagger as being relevant to the job title are the words, "software" and "engineer."

Consistent with some embodiments, the entity tagger 304 may pre-process the raw text of the job title by performing any one of a variety of text normalization operations. By way of example, the data tagger 304 may perform an acronym expansion operation to map any identified acronyms to their more formal long form words. The pre-processing may involve converting letters from upper case to lower case, converting numbers to words or words to numbers, or removing numbers, and removing stop words, or other particular words.

Next, as indicted by reference number 308, the words from the raw text of the job title that have been tagged by the entity tagger as being representative of the job title (e.g., "software" and "engineer") are mapped to pre-trained multilingual word embeddings. Pre-trained multilingual word embeddings are word embeddings for words in multiple languages that are represented in the same embedding space. Accordingly, two words expressed in different languages will have similar vector representations, such that they will be close in distance to one another in the common, multilingual word embedding space. When the output of the entity tagger includes two or more words that have been tagged as being representative of the job title, each word is mapped to an individual pre-trained multilingual word embedding, and then an operation is performed to take the average of the vector representations of each word. For instance, by way of example and with reference to FIG. 3, the word "software" is mapped to a first multilingual word embedding—that is, a vector in the multilingual word embedding space that corresponds with the word, "software." Similarly, the word "engineer" is mapped to a second multilingual word embedding—that is, a vector in the multilingual word embedding space that corresponds with the word, "engineer." Finally, an operation is performed to take the average of the two vectors. As illustrated in FIG. 3, the resulting vector representation of the raw text of the job title is shown with reference number 310.

Next, as indicated with reference number 312, the vector representation of the job title 310 from the online job posting 300 is provided as an input, along with other input features 314, to a trained multi-layer perceptron neural network. The additional input features may include features that are derived from other characteristics or attributes of the online job posting from which the job title was extracted. In some instances, the additional features may be tagged text from the raw text of the job title of the online job posting 300, as tagged by the entity tagger 304. By way of example, the additional input features to the neural network 312 may include information indicating skills identified in the online job posting, a location of an employment position, salary information for the employment position, the company name of the company offering the employment position, or any other characteristics or attributes of the online job posting. The neural network 312 operates on the input features to translate the vector representation of the job title in the multilingual embedding space 310 to a vector representation of the job title in the entity embedding space 316.

Consistent with some embodiments, the multilayer perceptron neural network 312 consists of three-layers of nodes (e.g., input layer, hidden layer, output layer) and is trained with a supervised training technique referred to as back-propagation. Accordingly, in order to train the neural network 312 to translate a first vector in a multilingual word embedding space to a second vector in an entity embedding space, labeled training data must be derived. Specifically, the training data consists of pairs of vectors associated with matching job titles—an input vector that corresponds with a multilingual word embedding that is representative of a particular job title, with an expected output vector that corresponds with an entity embedding that is representative of an entity in the title taxonomy that is also associated with the particular job title. In order to identify the pairs of related vectors, a domain expert may manually select or identify online job postings that have job titles (e.g., raw text) that is known to correspond with particular job titles associated with entities in the title taxonomy. After identifying pairings of online job postings and entities from the title taxonomy, the relevant data from the pairings can be extracted for use as labeled data for training the neural network.

The vector 316 that is output by the neural network 312 is a vector representation of the job title of the online job posting in the entity embedding space. However, as the vector 316 that is output by the neural network 312 is not likely to be an exact match with a vector corresponding with an entity in the entity embedding space associated with the title taxonomy, the next step involves performing a nearest neighbor search. For example, using the vector 316 as output by the neural network 312, a nearest neighbor search is performed to identify the vector corresponding with an entity in the entity embedding space 320 that is closest in distance to the vector 316 output by the neural network 312. As indicated in FIG. 3, the vector representation 318 of the entity that corresponds with the job title, "software engineer" is the closest in distance to the vector 316 output by the neural network. Accordingly, this vector representation 318, which corresponds with the entity in the title taxonomy that includes the job title, "software engineer" is stored in association (e.g., as part of a common data record) with the online job posting 300.

Consistent with some embodiments, instead of identifying a single vector corresponding with an entity in the entity embedding space that is closest in distance to the vector 316 output by the neural network 312, a nearest neighbor search, or an approximate nearest neighbor search is performed to identify and select more than one vector in the entity embedding space. For example, the nearest neighbor search may be performed to select some predetermined number of vectors that are close in distance to the vector 316 output by the neural network. With some embodiments, the nearest neighbor search may be an approximate nearest neighbor search performed to find all, or some subset of, vectors that are determined to be within some predetermined distance from the vector 316 output by the neural network. As each vector is representative of an entity in the title taxonomy, each vector is associated with a job title.

When multiple vectors (e.g., entity embeddings) are identified as part of the nearest neighbor search, the entities from the title taxonomy corresponding with the multiple vectors in the entity embedding space may be ranked in accordance with a ranking algorithm. Consistent with some embodiments, a machine learned model is trained to derive a ranking score (e.g., between 0 and 1) to indicate the relevance of each candidate entity. With some embodiments, the model is based on a gradient tree boosting model, which produces a score based on variety of input features, including embedding features from the entity and job posting, information indicating the quality of various title features from the title taxonomy, and text-based features from the job posting and/or title taxonomy.

Figure 4:
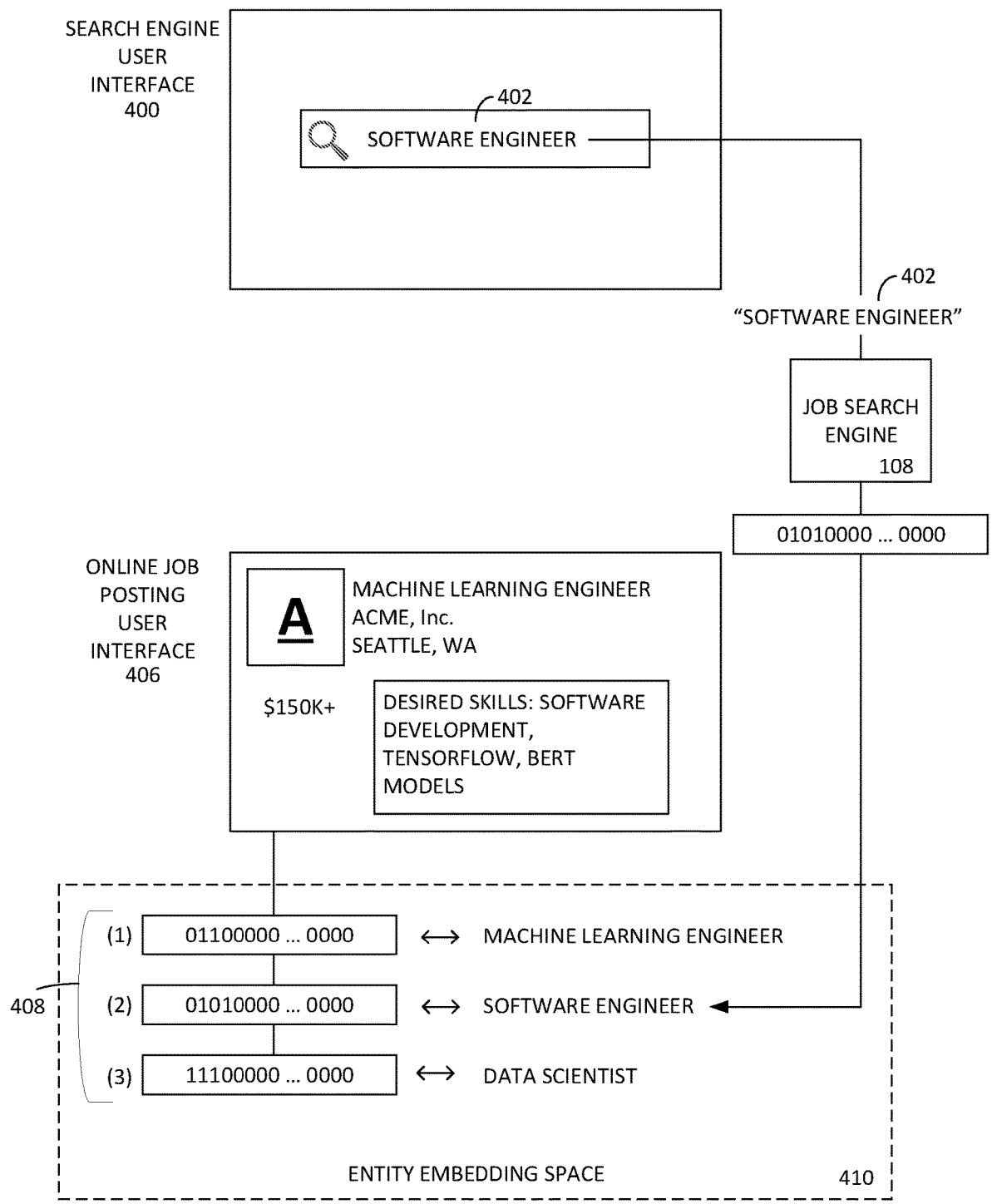
FIG. 4 illustrates an example of how a job search engine may process a search query to identify one or more online job postings with which one or more entity embeddings have been associated, according to an embodiment of the present invention.

After a job title of a job posting has been mapped, via an entity embedding, to one or more entities in the title taxonomy, as described and illustrated in connection with FIG. 3, one or more of the various applications and/or services of an online service may utilize the entity embedding(s) associated with the online job posting. By way of example, FIG. 4 illustrates one example of how a job search engine may process a search query to identify one or more online job postings with which one or more entity embeddings have been associated, according to an embodiment of the present invention. As shown in FIG. 4, an online job posting is presented via a user interface 406. In this instance, the online job posting is associated with a ranked list of entity embeddings 408 in the entity embedding space 410. Each entity embedding in the ranked list 408 corresponds with an entity in the title taxonomy, and thus a corresponding job title. For example, the first entry in the ranked list 408 indicates that the entity embedding corresponds with the job title, "Machine Learning Engineer." The second entry in the ranked list 408 indicates that the entity embedding corresponds with the job title, "Software Engineer." Finally, the third entry in the ranked list 408 indicates that the entity embedding corresponds with the job title, "Data Scientist."

As shown in FIG. 4, a user has submitted via a user interface 400 a search query 402 (e.g., "software engineer") to a job search engine 108. The job search engine 108 may map the search query to an entity embedding in the entity embedding space, corresponding with an entity in the title taxonomy. This entity embedding, which corresponds with the job title, 'Software Engineer," is then used to select the online job posting that has, as indicated by the raw text, a job title of, "Machine Learning Engineer," because the entity embedding generated from the search query matches the second entity embedding in the ranked list of entity embeddings associated with the job title of the online job posting. Accordingly, the entity embeddings in the entity embedding space can be used to map job titles, as used in search queries, or user profiles, with job titles from the title taxonomy.

Figure 5:
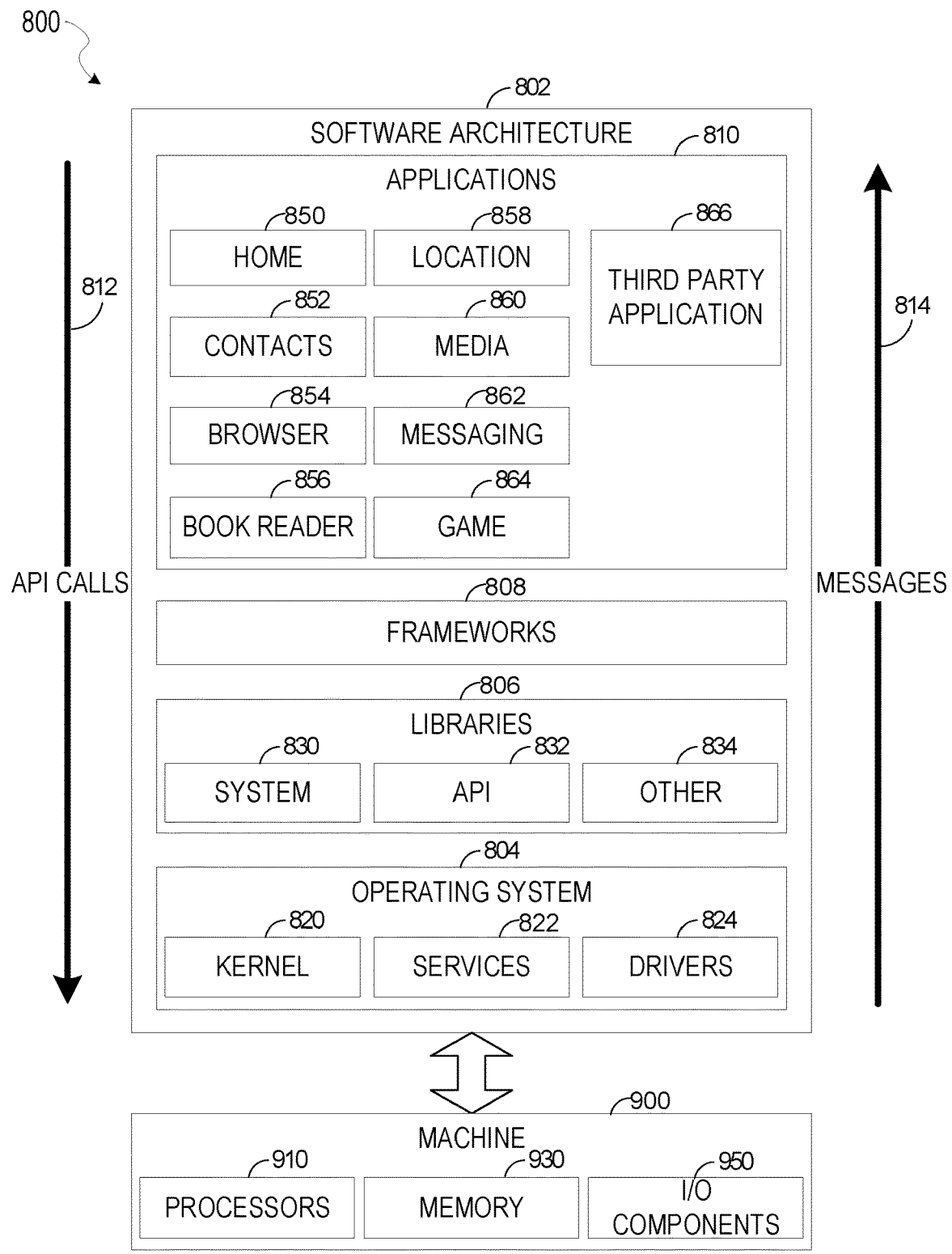
FIG. 5 is a diagram illustrating a software architecture, in accordance with an example embodiment of the present invention.

FIG. 5 is a block diagram 800 illustrating a software architecture 802, which can be installed on any of a variety of computing devices to perform methods consistent with those described herein. FIG. 5 is merely a non-limiting example of a software architecture, and it will be appreciated that many other architectures can be implemented to facilitate the functionality described herein. In various embodiments, the software architecture 802 is implemented by hardware such as a machine 900 of FIG. 6 that includes processors 910, memory 930, and input/output (I/O) components 950. In this example architecture, the software architecture 802 can be conceptualized as a stack of layers where each layer may provide a particular functionality. For example, the software architecture 802 includes layers such as an operating system 804, libraries 806, frameworks 808, and applications 810. Operationally, the applications 810 invoke API calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 806 provide a low-level common infrastructure utilized by the applications 810. The libraries 606 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810, according to some embodiments. For example, the frameworks 608 provide various GUI functions, high-level resource management, high-level location services, and so forth. The frameworks 808 can provide a broad spectrum of other APIs that can be utilized by the applications 810, some of which may be specific to a particular operating system 804 or platform.

In an example embodiment, the applications 810 include a home application 850, a contacts application 852, a browser application 854, a book reader application 856, a location application 858, a media application 860, a messaging application 862, a game application 864, and a broad assortment of other applications, such as a third-party application 866. According to some embodiments, the applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 866 can invoke the API calls 812 provided by the operating system 804 to facilitate functionality described herein.

Figure 6:
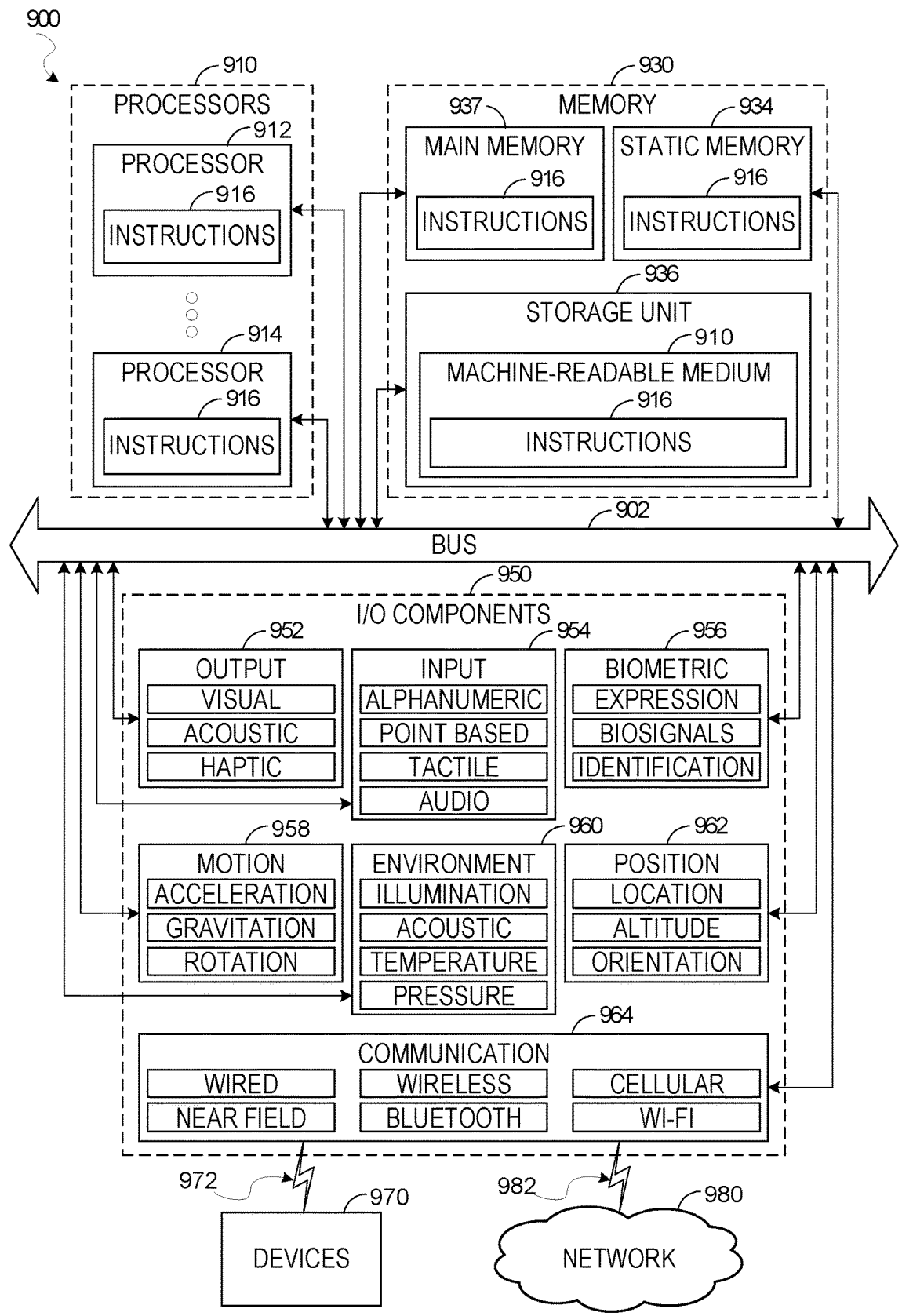
FIG. 6 shows a diagrammatic representation of the machine in the example form of a computer system, within which instructions (e.g., software, a program, an application, an applet, an app, or other executable code) for causing the machine to perform any one or more of the methodologies discussed herein may be executed.

FIG. 6 illustrates a diagrammatic representation of a machine 900 in the form of a computer system within which a set of instructions may be executed for causing the machine to perform any one or more of the methodologies discussed herein, according to an example embodiment. Specifically, FIG. 6 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example the instructions 916 may cause the machine 900 to execute any one of the methods or processes described in connection with descriptions of FIGS. 1 through 5. Additionally, or alternatively, the instructions 916 may implement the systems described in connection with any of FIGS. 1 through 5, and so forth. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions contemporaneously. Although FIG. 9 shows multiple processors 910, the machine 900 may include a single processor with a single core, a single processor with multiple cores (e.g., a multi-core processor), multiple processors with a single core, multiple processors with multiples cores, or any combination thereof.

The memory 930 may include a main memory 937, a static memory 934, and a storage unit 936, all accessible to the processors 910 such as via the bus 902. The main memory 937, the static memory 934, and storage unit 936 store the instructions 916 embodying any one or more of the methodologies or functions described herein. The instructions 916 may also reside, completely or partially, within the main memory 937, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 930, 937, 934, and/or memory of the processor(s) 910) and/or storage unit 936 may store one or more sets of instructions and data structures (e.g., software) embodying or utilized by any one or more of the methodologies or functions described herein. These instructions (e.g., the instructions 916), when executed by processor(s) 910, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 980 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., HTTP). Similarly, the instructions 916 may be transmitted or received using a transmission medium via the coupling 972 (e.g., a peer-to-peer coupling) to the devices 070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A computer-implemented method, comprising:
  training a multilayer perceptron neural network using training data, wherein an instance of training data in the set of training data includes a first vector representation of a job title in a multilingual word embedding space and a second vector representation of an entity in an entity embedding space, wherein the job title corresponding with the first vector representation is a job title that corresponds with a job title associated with the entity represented by the second vector representation in the entity embedding space;
  providing as input to an input layer of the multilayer perceptron neural network a vector representation of a job title of an online job posting, the vector representation of the job title of the online job posting derived by mapping one or more words identified in raw text of the job title to one or more pre-trained multilingual word embeddings in the multilingual word embedding space, wherein a pre-trained multilingual word embedding comprises a vector representation of the job title expressed in multiple languages;
  with the multilayer perceptron neural network, processing the input to translate the vector representation of the job title of the online job posting in the multilingual word embedding space to a vector representation of the job title of the online job posting in the entity embedding space associated with a multilingual title taxonomy;
  performing a nearest neighbor search to identify one or more vector representations corresponding with one or more entity embeddings in the entity embedding space, each of the one or more entity embeddings associated with a job title from the multilingual title taxonomy; and
  storing with the online job posting at least one of the one or more vector representations corresponding with the entity embedding in the entity embedding space.

2. The computer-implemented method of claim 1, further comprising:
  prior to providing the vector representation of the job title of the online job posting to the input layer of the multilayer perceptron neural network, processing the raw text of the job title of the online job posting with an entity tagger model to identify the one or more words in the raw text of the job title as words that are representative of the job title.

3. The computer-implemented method of claim 2, further comprising:
  responsive to the entity tagger model identifying two or more words in the raw text of the job title as words that are representative of the job title, calculating the vector representation of the job title of the online job posting by deriving an average of the vector representations for each of the two or more words in the raw text of the job title that have been identified as representative of the job title.

4. The computer-implemented method of claim 1, wherein performing the nearest neighbor search to identify one or more vector representations corresponding with one or more entity embeddings in the entity embedding space comprises performing an approximate nearest neighbor search.

5. The computer-implemented method of claim 1, further comprising:
  subsequent to performing the nearest neighbor search to identify the plurality of vector representations:
    for each entity embedding corresponding with a vector representation in the plurality of vector representations, ranking the job title from the title taxonomy associated with the entity embedding; and
    storing with the online job posting each vector representation of the plurality of vector representations corresponding with the entity embeddings in the entity embedding space with a ranking score for the job title associated with vector representation.

6. The computer-implemented method of claim 5, wherein ranking each job title from the title taxonomy comprises:
deriving the ranking score for each job title from the multilingual title taxonomy by providing as input to a machine learned model input features associated with the job title of the job posting and information associated with an entity in the multilingual title taxonomy corresponding with the entity embedding identified via the nearest neighbor search.

7. The computer-implemented method of claim 1, further comprising:
obtaining a set of training data for training the multilayer perceptron neural network.

8. A system comprising:
a processor; and
a memory storage device storing instructions thereon, which, when executed by the processor, cause the system to:
train a multilayer perceptron neural network using training data, wherein an instance of training data in the set of training data includes a first vector representation of a job title in a multilingual word embedding space and a second vector representation of an entity in an entity embedding space, wherein the job title corresponding with the first vector representation is a job title that corresponds with a job title associated with the entity represented by the second vector representation in the entity embedding space;
provide as input to an input layer of the multilayer perceptron neural network a vector representation of a job title of an online job posting, the vector representation of the job title of the online job posting derived by mapping one or more words identified in raw text of the job title to one or more pre-trained multilingual word embeddings in the multilingual word embedding space, wherein a pre-trained multilingual word embedding comprises a vector representation of the job title expressed in multiple languages;
with the multilayer perceptron neural network, process the input to translate the vector representation of the job title of the online job posting in the multilingual word embedding space to a vector representation of the job title of the online job posting in the entity embedding space associated with a multilingual title taxonomy;
perform a nearest neighbor search to identify one or more vector representations corresponding with one or more entity embeddings in the entity embedding space, each of the one or more entity embeddings associated with a job title from the multilingual title taxonomy; and
store with the online job posting at least one of the one or more vector representations corresponding with the entity embedding in the entity embedding space.

9. The system of claim 8, wherein the instructions, when executed by the processor, further cause the system to:
process the raw text of the job title of the online job posting with an entity tagger model to identify the one or more words in the raw text of the job title as words that are representative of the job title, prior to providing the vector representation of the job title of the online job posting to the input layer of the multilayer perceptron neural network.

10. The system of claim 9, wherein the instructions, when executed by the processor, further cause the system to:
calculate the vector representation of the job title of the online job posting by deriving an average of the vector representations for each of the two or more words in the raw text of the job title that have been identified as representative of the job title in response to the entity tagger model identifying two or more words in the raw text of the job title as words that are representative of the job title.

11. The system of claim 8, wherein the instructions, when executed by the processor, further cause the system to:
perform the nearest neighbor search to identify one or more vector representations corresponding with one or more entity embeddings in the entity embedding space by performing an approximate nearest neighbor search.

12. The system of claim 8, wherein the instructions, when executed by the processor, further cause the system to:
subsequent to performing the nearest neighbor search to identify the plurality of vector representations:
for each entity embedding corresponding with a vector representation in the plurality of vector representations, ranking the job title from the title taxonomy associated with the entity embedding; and
store with the online job posting each vector representation of the plurality of vector representations corresponding with the entity embeddings in the entity embedding space with a ranking score for the job title associated with vector representation.

13. The system of claim 8, wherein the instructions, when executed by the processor, further cause the system to rank each job title from the title taxonomy by:
derive a ranking score for each job title from the title taxonomy by providing as input to a machine learned model input features associated with the job title of the job posting and information associated with an entity in the title taxonomy corresponding with the entity embedding identified via the nearest neighbor search.

14. The system of claim 8, wherein the instructions, when executed by the processor, further cause the system to:
obtain a set of training data for training the multilayer perceptron neural network.

* * * * *